(12) United States Patent
Najork

(10) Patent No.: US 7,340,467 B2
(45) Date of Patent: Mar. 4, 2008

(54) SYSTEM AND METHOD FOR MAINTAINING A DISTRIBUTED DATABASE OF HYPERLINKS

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 10/413,645

(22) Filed: Apr. 15, 2003

(65) Prior Publication Data

US 2004/0210826 A1  Oct. 21, 2004

(51) Int. Cl.
*G06F 17/30* (2006.01)
(52) U.S. Cl. ............................................ 707/10; 707/1
(58) Field of Classification Search .............. 707/1–10, 707/100; 709/223; 713/150
See application file for complete search history.

(56) References Cited

U.S. PATENT DOCUMENTS

| | | | | |
|---|---|---|---|---|
| 6,098,081 | A * | 8/2000 | Heidorn et al. | 715/501.1 |
| 6,112,203 | A | 8/2000 | Bharat et al. | 707/5 |
| 6,301,614 | B1 * | 10/2001 | Najork et al. | 709/223 |
| 6,505,191 | B1 | 1/2003 | Baclawski | 707/3 |
| 6,601,066 | B1 * | 7/2003 | Davis-Hall | 707/5 |
| 7,032,168 | B1 * | 4/2006 | Gerace et al. | 715/501.1 |
| 2002/0103824 | A1 * | 8/2002 | Koppolu et al. | 707/501.1 |
| 2002/0133697 | A1 * | 9/2002 | Royer et al. | 713/150 |

OTHER PUBLICATIONS

Adler, M. et al., "Towards Compressing Web Graphs", *CMPSCI Technical Report*, 2000, 5 pages.

Arasu, A. et al., "PageRank Computation and the Structure of the Web: Experiments and Algorithms", *Technical Report, IBM Almaden Research Center*, Nov. 2001, 3 pages.

Bharat, K. et al., "Improved Algorithms for Topic Distillation in a Hyperlinked Environment", *21st ACM SIGIR Conference on Research and Development in Information Retrieval*, 1998, 5 pages.

Bharat, K. et al., "The Connectivity Server: fast access to linkage information on the Web", *Computer Networks and ISDN Systems*, 1998, 30, 469-477.

Brin, S. et al., "The Anatomy of a large-scale hypertextual Web search engine", *computer Networks and ISDN Systems*, 1998, 30, 107-117.

(Continued)

*Primary Examiner*—Don Wong
*Assistant Examiner*—Sheree N Brown
(74) *Attorney, Agent, or Firm*—Woodcock Washburn LLP

(57) ABSTRACT

Nodes of a web graph are distributed over a cluster of computers. Tables distributed over the computers map source (destination) locations to lists of destination (source) locations. To accommodate traversing hyperlinks forward, a table maps the location of a web page "X" to locations of all the web pages "X" links to. To accommodate traversing hyperlinks backward, a table maps the location of a web page "Y" to locations of all web pages that link to Y. URLs identifying web pages are mapped to fixed-sized checksums, reducing the storage required for each node, while providing a way to map a URL to a node. Mapping is chosen to preserve information about the web server component of the URL. Nodes can then be partitioned across the machines in the cluster such that nodes corresponding to URLs on the same web server are assigned to the same machine in the cluster.

12 Claims, 17 Drawing Sheets

OTHER PUBLICATIONS

Chen, Y-Y. et al., "I/O-Efficient Techniques for Computing Pagerank", *CIKM*, 2002, 5 pages.

Cormen, T.H. et al., "Introduction to Algorithms", *MIT Press/McGraw-Hill*, 1990, 337-344.

Ding, C. et al., "PageRank, HITS and a Unified Framework for Link Analysis", *Lawrence Berkeley National Laboratory*, Nov. 2001, 1-12.

Haveliwala, T. H. et al., "Efficient Computation of PageRank", Oct. 18, 1999, 1-15.

Kleinberg, J.M. "Authoritative Sources in a Hyperlinked Environment", *Proceedings of the ACM-SIAM Symposium on Discrete Algorithms*, 1998, 1-31.

"The PageRank Citation Ranking: Bringing Order to the Web", Jan. 29, 1998, 1-17.

Randall, K.H. et al., "The Link Database: Fast Access to Graphs of the Web", *SRC Research Report*, www.research.compaq.com/SRC, Nov. 16, 2001, 1-16.

Adler, M. et al., "Towards Compressing Web Graphs", *CMPSCI Technical Report*, 2000, 5 pages.

Arasu, A. et al., "PageRank Computation and the Structure of the Web: Experiments and Algorithms", *Technical Report, IBM Almaden Research Center*, Nov. 2001, 3 pages.

Bharat, K. et al., "Improved Algorithms for Topic Distillation in an Hyperlinked Environment", *21st ACM SIGIR Conference on Research and Development in Information Retrieval*, 1998, 5 pages.

Bharat, K. et al., "The Connectivity Server: fast access to linkage information on the Web", *Computer Networks and ISDN Systems*, 1998, 30, 469-477.

Brin, S. et al., "The Anatomy of a large-scale hypertextual Web search engine", *computer Networks and ISDN Systems*, 1998, 30, 107-117.

Chen, Y-Y. et al., "I/O-Efficient Techniques for Computing Pagerank", *CIKM*, 2002, 5 pages.

Cormen, T.H. et al., "Introduction to Algorithms", *MIT Press/McGraw-Hill*, 1990, 337-344.

Ding, C. et al., "PageRank, HITS and a Unified Framework for Link Analysis", *Lawrence Berkeley National Laboratory*, Nov. 2001, 1-12.

Haveliwala, T.H. et al., "Efficient Computation of PageRank", Oct. 18, 1999, 1-15.

Kleinberg, J.M. "Authoritative Sources in a Hyperlinked Environment", *Proceedings of the ACM-SIAM Symposium on Discrete Algorithms*, 1998, 1-31.

Lempel, R. et al., "The Stochastic Approach for Link-Structure Analysis (SALSA) and the TKC Effect", *Department of Computer Science, The Technion*, 1-39, Jun. 18, 1998.

"The PageRank Citation Ranking: Bringing Order to the Web", Jan. 29, 1998, 1-17.

Randall, K.H. et al., "The Link Database: Fast Access to Graphs of the Web", *SRC Research Report*, www.research.compaq.com/SRC, Nov. 16, 2001, 1-16.

Suel, T. et al., "Compressing the Graph Structure of the Web", pp. 1-10, 2001.

\* cited by examiner

DBP2

"Links To" Table L2

D1->D2,D3,E1
D2->D1
D3->D1
E1->C1,E2
E2->

DBP1

"Links To" Table L1

DBP1

"Links To" Table L1

T(A1)->(1,T(A2)),(1,T(A3)),(1,T(B1))
T(A2)->
T(A3)->(1,T(A1)),(1,T(A2))
T(B1)->(1,T(B2)),(1,T(B3)),(1,T(C1))
T(B2)->(1,T(B3))
T(B3)->(1,T(B1))
T(C1)->(1,T(A1)),(1,T(C2)),(2,T(D1))
T(C2)->(1,T(C1))

DBP2

"Links To" Table L2

T(D1)->(2,T(D2)),(2,T(D3)),(2,T(E1))
T(D2)->(2,T(D1))
T(D3)->(2,T(D1))
T(E1)->(1,T(C1)),(2,T(E2))
T(E2)->

SYSTEM AND METHOD FOR MAINTAINING A DISTRIBUTED DATABASE OF HYPERLINKS

FIELD OF THE INVENTION

The present invention relates to hyperlink maintenance and more specifically relates to maintaining large numbers of hyperlinks via a distributed database.

BACKGROUND OF THE INVENTION

Web search services allow users to submit queries, and in response return a set of links to web pages that satisfy the query. Because a query may potentially produce a large number of results, results are typically displayed in a ranked order. There are many ways to rank-order the links resulting from a query, including content-based ranking, usage based ranking, and link-based ranking. Content-based ranking techniques determine how relevant the content of a document is to a particular query. Usage-based ranking techniques monitor which result links users actually follow, and boost the ranks of these result links for subsequent queries. Link-based ranking techniques examine how many other web pages link to a particular web page, and assign higher ranks to pages with many incoming links.

One problem associated with these techniques is scalability. For example, a well known search engine has been observed to contain approximately three (3) billion web pages over which it can search. Also observed from analyzing one (1) billion web pages is that each web page had an average of 42 distinct outgoing links. Thus, a web graph modeling significant portions of the web will have billions of nodes and on the order of 100 billion edges.

Previous attempts to address this problem include fitting fairly large web graphs into the main memory of a very-large memory processor by compressing nodes and edges, and storing the web graph on disk. However, these attempts have their own limitations. For example, fitting a graph representing one (1) billion web pages and 40 billion links between them may require a machine with approximately 50 GB of main memory. This amount of memory exceeds the capacity of cost-efficient commodity PCs, which typically have up to 4 GB per machine. Furthermore, this technique does not scale to arbitrarily large web graphs, since there is a dearth of very-large-memory computers. Storing a large web graph on a disk increases access time. It has also been observed that computing the ranks of 180 million web pages can take approximately 25 minutes, and it is estimated that computing the rank for 10 times that many pages would take more than 10 times longer (worse than linear behavior). This technique scales poorly as the web graphs increase in size. It is also impracticable to conduct link-based ranking at query time due to the long access times.

A technique for maintaining a large number of links, which overcomes the above described time and scalability problems is desired.

SUMMARY OF THE INVENTION

A method for maintaining a database of hyperlinks, wherein each hyperlink has a respective source location and destination location includes forming respective location identifiers indicative of at least one of the source and destination locations and distributing the location identifiers over a plurality of database processors. Storing location identifiers instead of the actual location addresses provides the capability to create locations identifiers which utilize less memory than the location addresses. Distributing the location identifiers over a plurality of database processors rather than storing all locations identifiers on a single database processor reduces the processing and storage requirements for each database processor. Thus, the database processors may be realized by relatively easily obtainable and affordable commercial processors. A distributed database for implementing the method includes a plurality of database processors. Each database processor includes a uniform resource locator (URL) receiving portion, a URL identifier (UID) generator, a data storage portion, and a data providing portion. The URL receiving portion receives URLs. The UID generator generates UIDs indicative of at least one of the source and destination locations. The data storage portion stores the UIDs. The data providing portion provides data to the plurality of database processors.

BRIEF DESCRIPTION OF THE DRAWINGS

The features and advantages of the present invention will be best understood when considering the following description in conjunction with the accompanying drawings, of which:

FIG. 14 is an illustration of database processors having link tables in accordance with an exemplary embodiment of the present invention;

FIG. 16 is an illustration of database processors having link tables in accordance with yet another exemplary embodiment of the present invention.

DETAILED DESCRIPTION OF ILLUSTRATIVE EMBODIMENTS

A system and method for maintaining a database of hyperlinks resulting from a web crawl, for example, in accordance with the present invention distributes identifiers of the hyperlinks over a plurality of database processors. In this embodiment, the crawl results are in the form of links (hyperlinks) to locations, such as URLs (uniform resource locators), and the identifiers are in the form of URL identifiers (UIDs). The URLs are mapped to form UIDs that are smaller (utilize less memory), and therefore more easily maintained in a database, than the actual URLs. Using UIDs to represent links allows a large database of hyperlinks to be maintained over a relatively small number of database processors. In an exemplary embodiment, the database processors comprise commodity processors, each having a relatively small amount of memory (e.g., 4 GB) and the database processors are inter-coupled via a high speed network. This provides efficient means for storing a graph induced by pages of the World Wide Web and the hyperlinks there between. This system and method are particularly applicable to processes requiring a large number of hyperlinks to be maintained, such as link-based ranking algorithms (e.g., PAGERANK, HITS, or SALSA, as well as services such as the "who links to this page" service offered by GOOGLE and ALTAVISTA).

Figure 1:
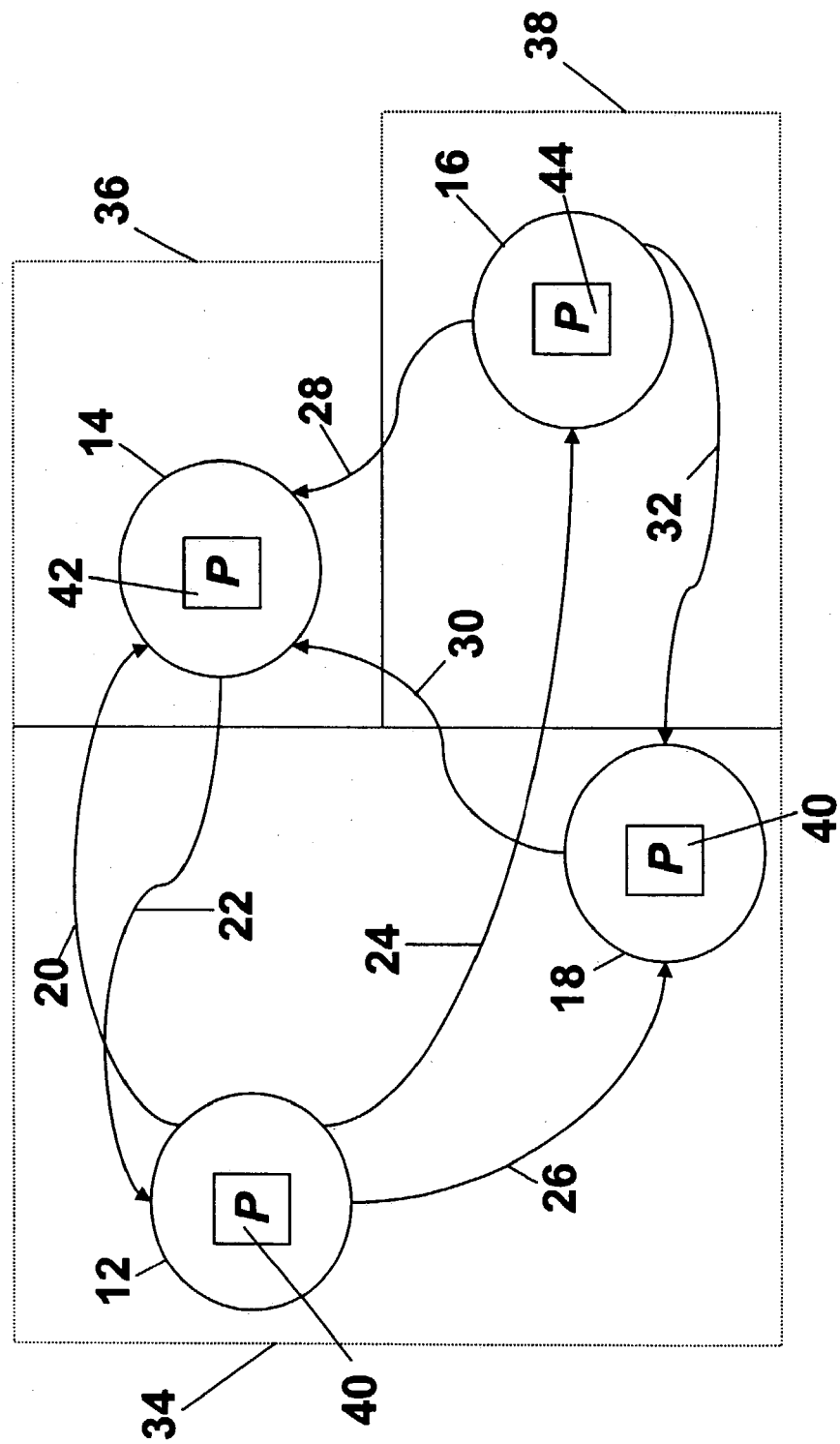
FIG. 1 is an illustration of the nodes and links of a web-graph partitioned into clusters in accordance with an exemplary embodiment of the present invention.

Web-graphs, such as shown in FIG. 1, are used herein to illustrate and describe embodiments of the present invention. A web-graph comprises nodes, such as nodes 12, 14, 16, and 18, connected by links, such as 20, 22, 24, 26, 28, 30, and 32. Various embodiments of the present invention are described in detail below. In one embodiment, nodes of a web graph are distributed over a cluster of computers (database processors) that are interconnected via a high-speed commodity network. The location of all destination nodes of links having a common source node are stored on the same database processor that stores the location of the common source node. For example, the destination locations of all links with source location "X" are stored on the same database processor that stores the source location "X" itself. This provides the ability to traverse links forward. In another embodiment, the locations of all source nodes of links having a common destination node are stored on the database processor that stores the location of the common destination node. For example, the source locations of all links with destination location "Y" are stored on the same database processor that stores the destination location "Y" itself. This provides the ability to traverse links backwards. URLs identifying web pages are hashed to fixed-sized checksums, reducing the storage required for each node, while providing a probabilistic way to map a URL to a node. In yet another embodiment, hash functions are chosen in such a way that information about the host component of the URL is preserved. The set of nodes are then partitioned across the database processors in the cluster such that nodes corresponding to URLs on the same web server are assigned to the same database processor in the cluster. It is anticipated that, due to the prevalence of relative links (links to nodes on the same processor) on the web, this will result in many of the edges in the graph being between nodes on the same database processor in the cluster.

Referring now to FIG. 1, there is shown an illustration of the nodes and links of a web-graph distributed into clusters in accordance with an embodiment of the present invention. Web graph 100 comprises nodes 12, 14, 16, and 18. The web graph 100 also comprises links 20, 22, 24, 26, 28, and 30. Each node is connected to another node via a link. For example, nodes 12 and 14 are connected by links 20 and 22. Each node represents a location on a network, such as a URL on the Internet. Furthermore, each node may be associated with a web server. A web server is denoted by the boxed P shown within each node. As depicted in graph 100, node 12 is associated with web server 40, node 14 is associated with web server 42, node 18 is associated with web server 40, and node 16 is associated with web server 44. A web server is a processor on which a node is implemented that serves the web page associated with the URL. For example, node 12 may represent a web page have a specific URL, http://www.widget.com/products.html, and that specific web page may be hosted on the web server 40, such as a server maintained by the owner of the widget.com web site. It is to be understood that is it not required that each node be associated with a unique web server. Several nodes may be associated with a common web server. For example, nodes 12 and 18 may be associated with the same web server 40 (e.g., the widget server referenced above). Each link has a source node indicative of a source location (e.g., the web page containing the link) and a destination node indicative of a destination location (e.g., the web page the link refers to). For example, nodes 12 and 14 are connected by links 20 and 22. Link 20 has a source node 12 and a destination node 14. Link 22 has a source node 14 and a destination node 12.

The web graph 100 is distributed over clusters 34, 36, and 38. Each cluster represents a single (or group of) database processor(s) for maintaining hyperlinks. The cluster grouping depicted in FIG. 1 is exemplary, and it is to be understood that various other cluster groupings are appropriate. A cluster represents a database processor or group of database processors over which a database of hyperlinks is distributed. A database processor may be any appropriate means for maintaining a database of hyperlinks, for example a general purpose processor, a dedicated processor, hardware components, software components, or a combination thereof. Nodes are assigned to clusters in accordance with various attributes. For example, the destination locations of nodes associated with hyperlinks having a common source location may be grouped into a cluster, the common source node may also be grouped into the cluster, nodes associated with hyperlinks having a common web server, may be grouped into a cluster (e.g., nodes corresponding to URLs on same web server are assigned to the same cluster), or a combination thereof.

Figure 2:
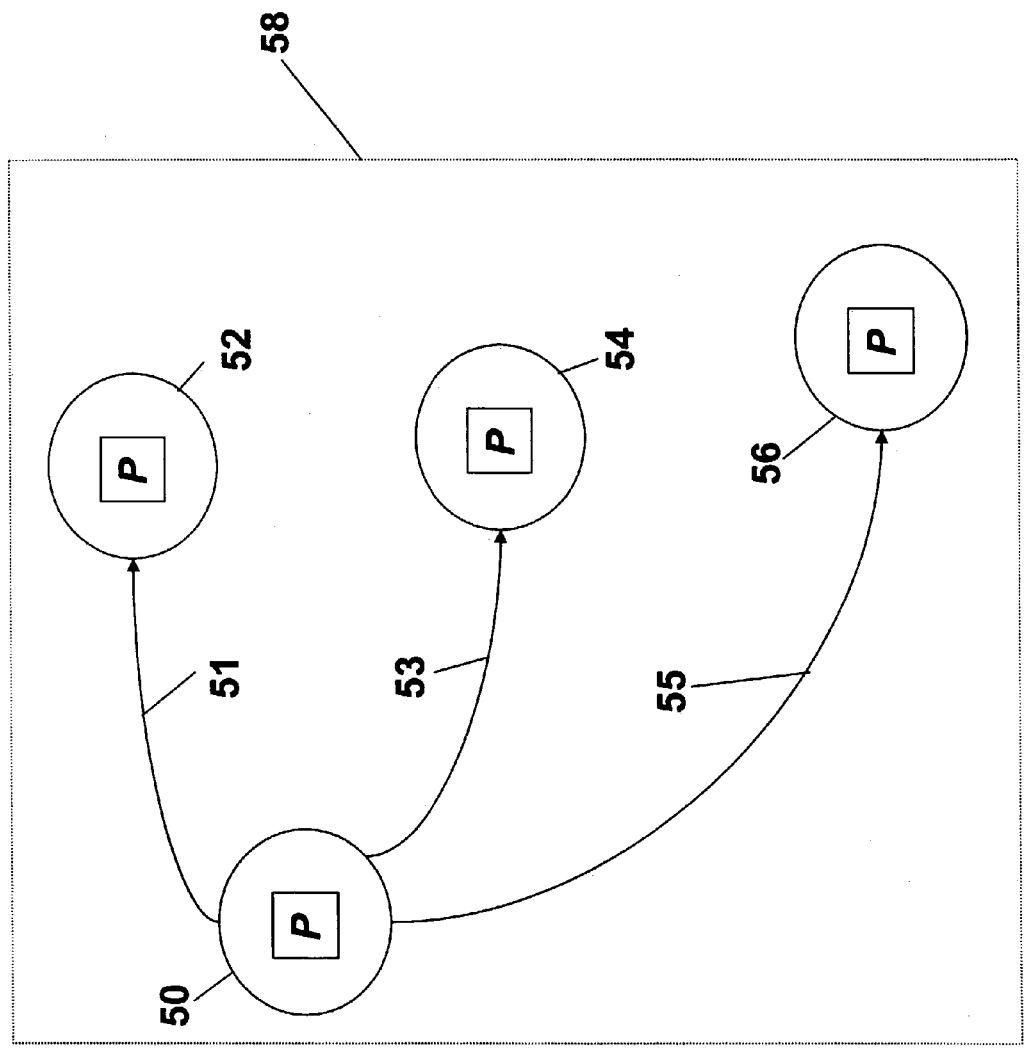
FIG. 2 is a web-graph depicting destination nodes linked to a common source node stored in the same database processor, in accordance with an exemplary embodiment of the present invention.

FIG. 2 is a web-graph 200 depicting destination nodes linked to a common source node stored in the same database processor, in accordance with an embodiment of the present invention. In FIG. 2, hyperlinks 51, 53, and 55, have a common source node 50 and the nodes to which those links point (nodes 52, 54, and 56), are formed into a cluster 58. To facilitate efficient maintenance of the database of hyperlinks over a plurality of database processors, the locations of nodes 52, 54, and 56 are stored on a common database processor represented by cluster 58. Processes for determining which hyperlinks leave a given web page are known in the art. As described in more detail below, respective identifiers (referred to as URL identifiers or UIDs) which identify the locations (e.g., URLs) of each node 52, 54, and 56 are stored in a database distributed over the cluster 58 of database processors. In another embodiment of the present invention, the source node 50 is also stored in the same database processor. As previously described, cluster 58 may represent a single database processor or a plurality of database processors. However, for the sake of clarity, and in accordance with an embodiment of the present invention, the cluster 58 is described as a single database processor (machine), and the phrases "cluster 58" and "database processor 58" are used interchangeably.

As nodes are added to, or removed from, a cluster, the cluster is informed of the addition/deletion. In one embodiment of the present invention, each UID contains a predetermined number of bits dedicated for node identification. For example, each UID may comprise 2 bits identifying the cluster (database processor) to which the corresponding node is assigned.

Figure 3:
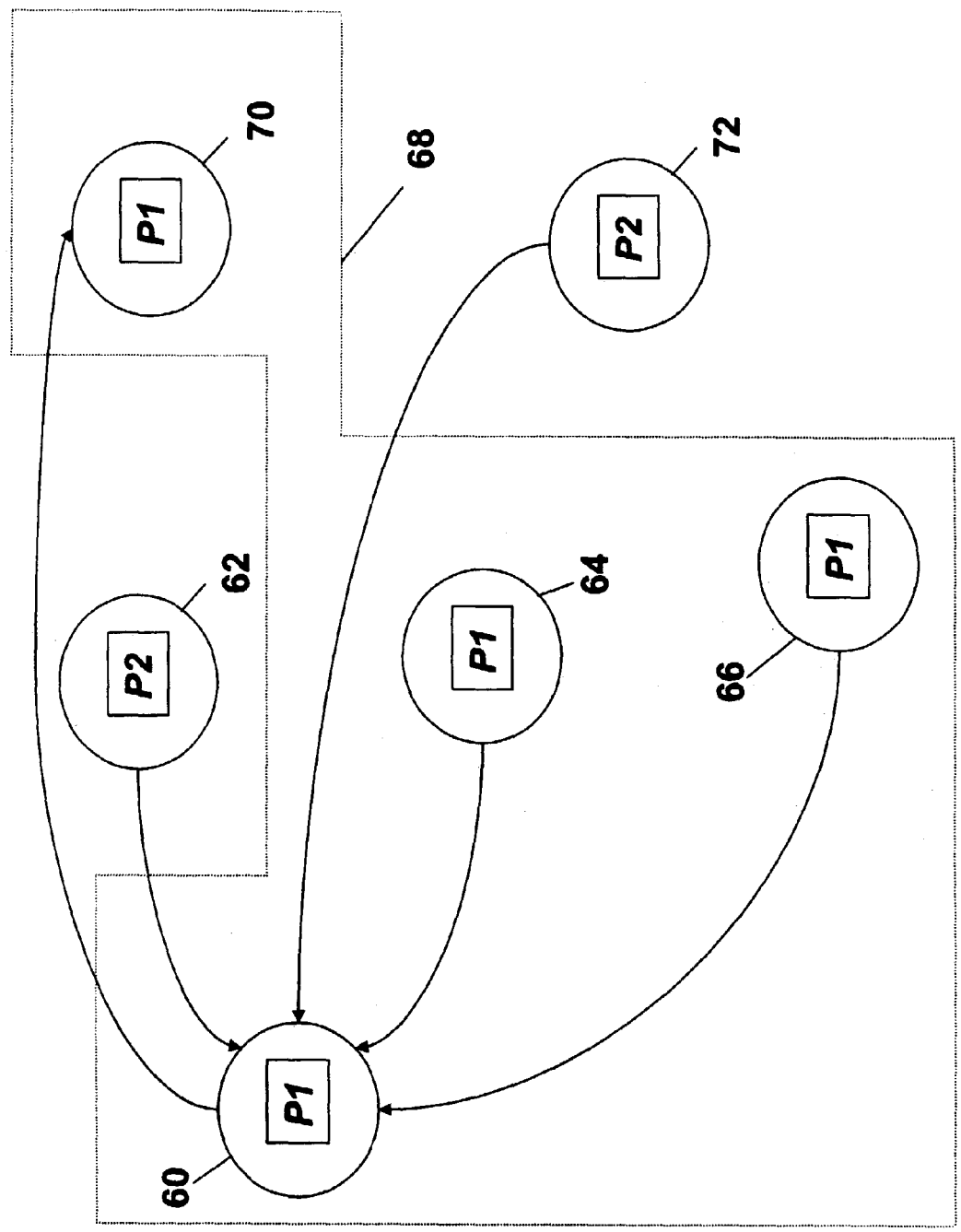
FIG. 3 is a web-graph of nodes having common web servers maintained by a database processor, in accordance with an exemplary embodiment of the present invention.

In another embodiment of the present invention, as depicted in FIG. 3, nodes having a common web server are maintained by a database processor. FIG. 3 shows nodes 60, 64, 66, 70, having common web server P1 formed into the database processor 68. Nodes 62 and 72 are hosted on web server P2, and are not grouped into the database processor 68. Thus, UIDs for nodes 60, 64, 66, 70, are maintained by a database implemented on database processor 68 and stored in tables residing therein. It is to be understood that various embodiments of the present invention include combinations of the above described embodiments. For example, destination nodes linked to a common node, and nodes having a common web server are stored in the same database processor.

Figure 4:
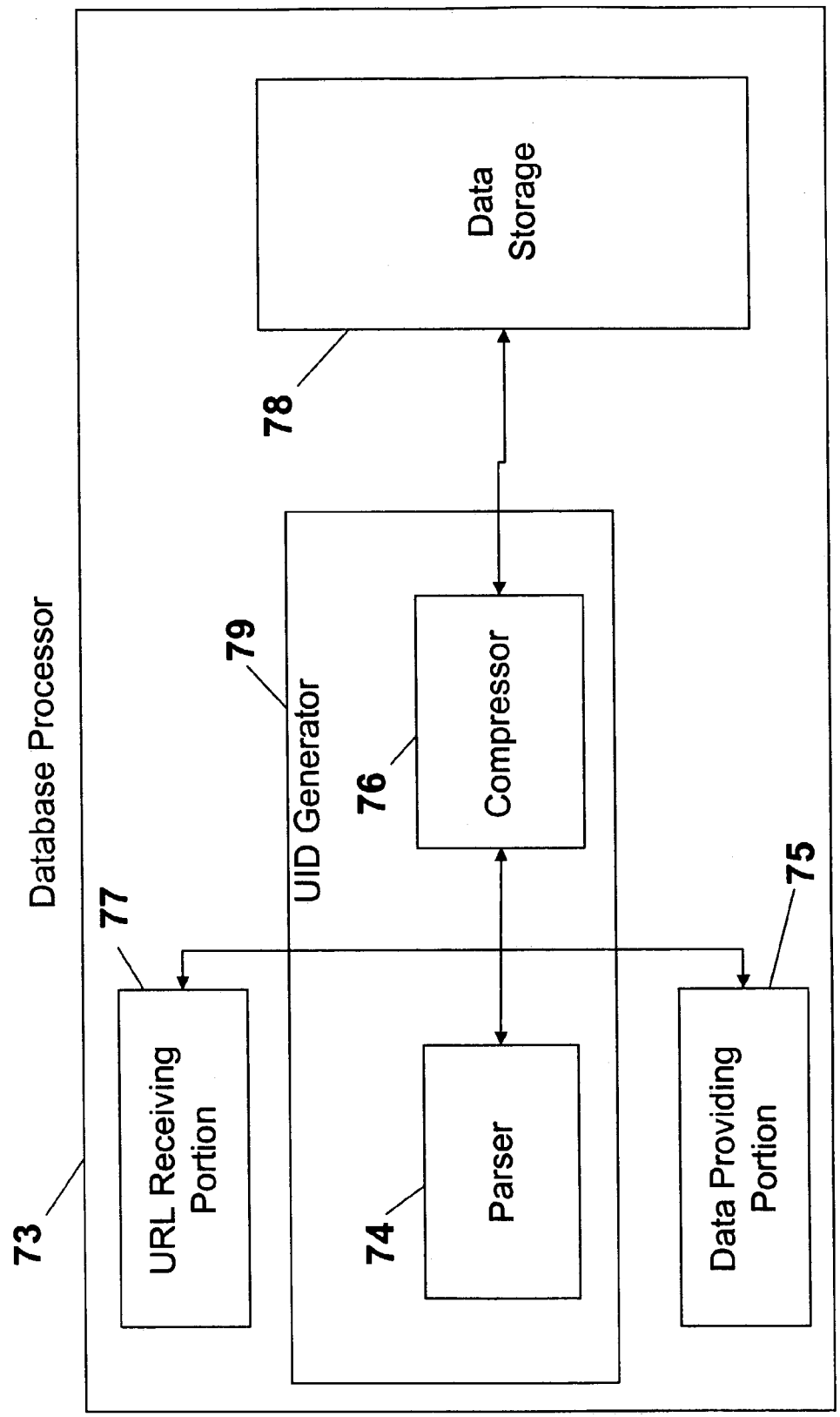
FIG. 4 is a functional block diagram of a database processor in accordance with an exemplary embodiment of the present invention.

FIG. 4 is a functional block diagram of a database processor 73 in accordance with the present invention. An embodiment of the distributed database in accordance with the present invention comprises a plurality of databases 73. Each database processor 73 comprises a URL receiving portion 77, a URL identifier (UID) generator 79, a data providing portion 75, and a data storage portion 78. The URL receiving portion 77 receives location information corresponding to sources and/or destinations (e.g., nodes) of links. The data providing portion 75 provides data to other database processors 73 in the distributed database. This information/data may be received/provided via any appropriated means, such as a network interface, wirelessly, optically, or a combination thereof, for example. In one embodiment, information pertains to URLs. The URL information received by receiving portion 77 is available to the other portions of the database processor 73. Optionally, the database processor 73 performs functions in addition to database maintenance, such as ranking web pages. Thus, the database processor 73 could perform database functions, rank web pages corresponding to the received URLs, and provide the ranking results via the data providing portion 75.

The UID generator 79 is described in more detail below. Generally, however, the UID generator 79 generates location identifiers indicative of the URL information received by the URL receiving portion 77. The UID generator 79 generates UIDs having a fixed size (e.g., number of bits), such as an integer and/or floating point value. The fixed size UTDs are smaller (utilize less memory) than the URLs. The UID generator 79 comprises an optional parser 74 and a compressor 76. The compressor 76 compresses the URL information into UIDs having values of fixed size. The compressor 76 may utilize any appropriate function to compress the URL information, such as a hashing function, a numeric value mapping function (e.g., assigning/mapping each URL to a numeric value), or a combination thereof, for example. The parser 74 parses the URL information received by the URL receiving portion 77, the UIDs, or a combination thereof, into categories. The categories include local links (links to nodes on the same database processor), remote links (links to nodes on other than the same database processor), "link to" nodes (nodes that a link points to), "link from" nodes (nodes from which a link points), or a combination thereof. The data storage portion 78 stores the UIDs. In one embodiment, the data storage portion 78 is formed to store UIDs in separate tables corresponding to parsed categories. The data providing portion 75 provides data to other database processor in the distributed database.

Figure 5:
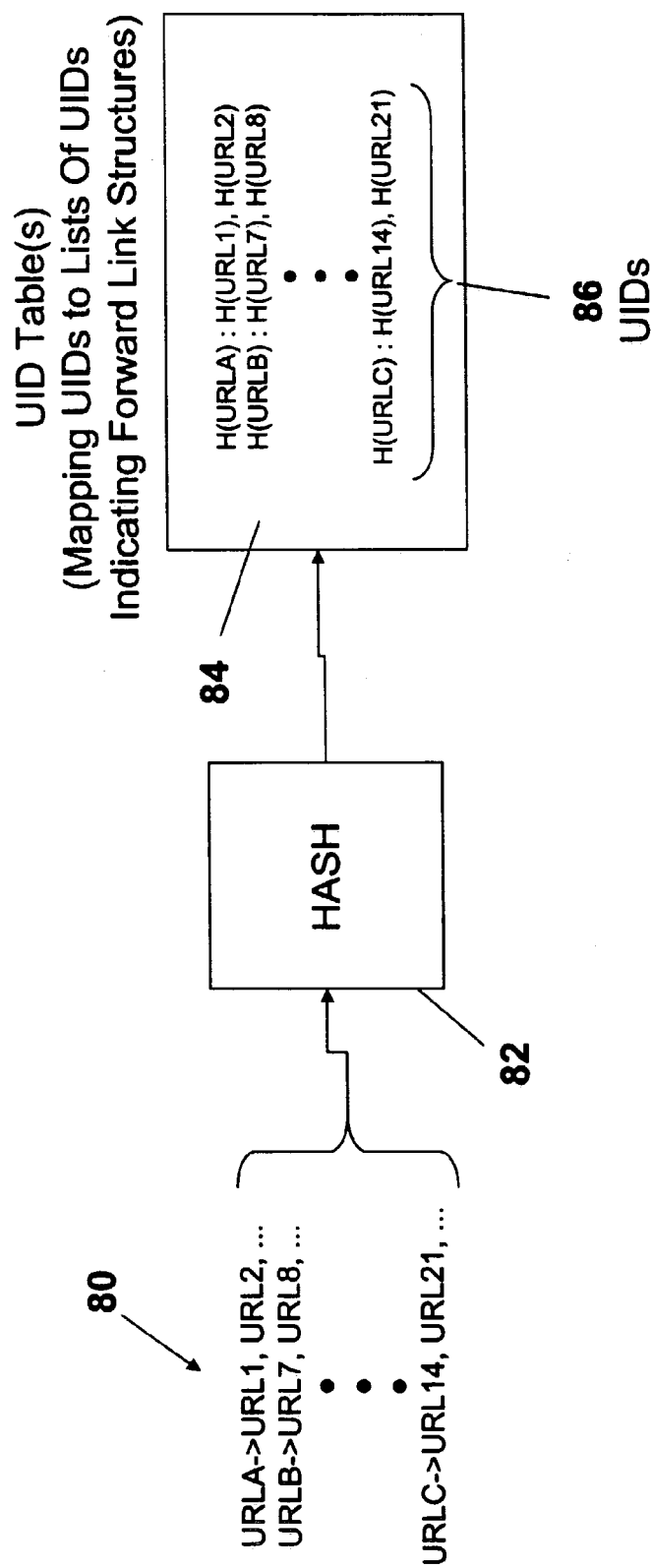
FIG. 5 is a diagram illustrating hashed URLs stored in a table of a database processor, in accordance with an exemplary embodiment of the present invention.

FIG. 5 is a diagram illustrating hashed URLs stored in a table of a database processor, in accordance with an embodiment of the present invention. To facilitate maintaining a database of hyperlinks over a plurality of database processors, locations, e.g., URLs 80, are hashed by hasher 82 and the resulting URL identifiers (UIDs) 86 are stored in table(s) 84 within the database. The URLs 80 are indicative of the hyperlink structure discovered during a web crawl. For example, as shown in FIG. 5, the urlA is linked to at least url1 and url2; urlB is linked to at least url7 and url8; and urlC is linked to at least url14 and url21. The hyperlink structure can be in various forms. Examples of which include, a stream of URL pairs comprising source location and destination, each indicating one hyperlink, or pairs comprising source location and a list of destination locations indicating the complete list of hyperlinks contained in a web page. The hasher 82 hashes the URLs 80, and provides the resulting UIDs 86 to the database table 84. Thus, the table 84 maps UIDs to a list of UIDs. Each UID is a hashed value of its corresponding URL. For example, as depicted in FIG. 5, the table 84 contains a UID indicative of the hashed value of URLA (indicated by H(urlA) mapped to the UIDs H(url1) and H(url2); H(urlB) mapped to H(url7) and H(url8); and H(urlC) mapped to H(url14) and H(url21). A hash function is a function that transforms a variable-size input into a fixed size string. Typically, hash functions are one way, meaning that it is impracticable or impossible to determine the input value from the output (transformed) value. The hasher 82 hashes URLs 80, providing fixed length UIDs 86. Each UID 86 is indicative of a respective URL (or portion thereof, such as the home address or path addresses) 80. The hasher 82 may utilize any appropriate hash function, such as the well known MD2, MD5 and SHA1 hash functions, for example. Hashing the URLs 80 provides fixed length UIDs 86 to represent the variable length URLs 80. On average, each UID 86 is smaller in size than the corresponding URL 80, thus allowing the database of UIDs 86 to be maintained utilizing less memory than would be required to maintain a database of URLs.

Figure 6:
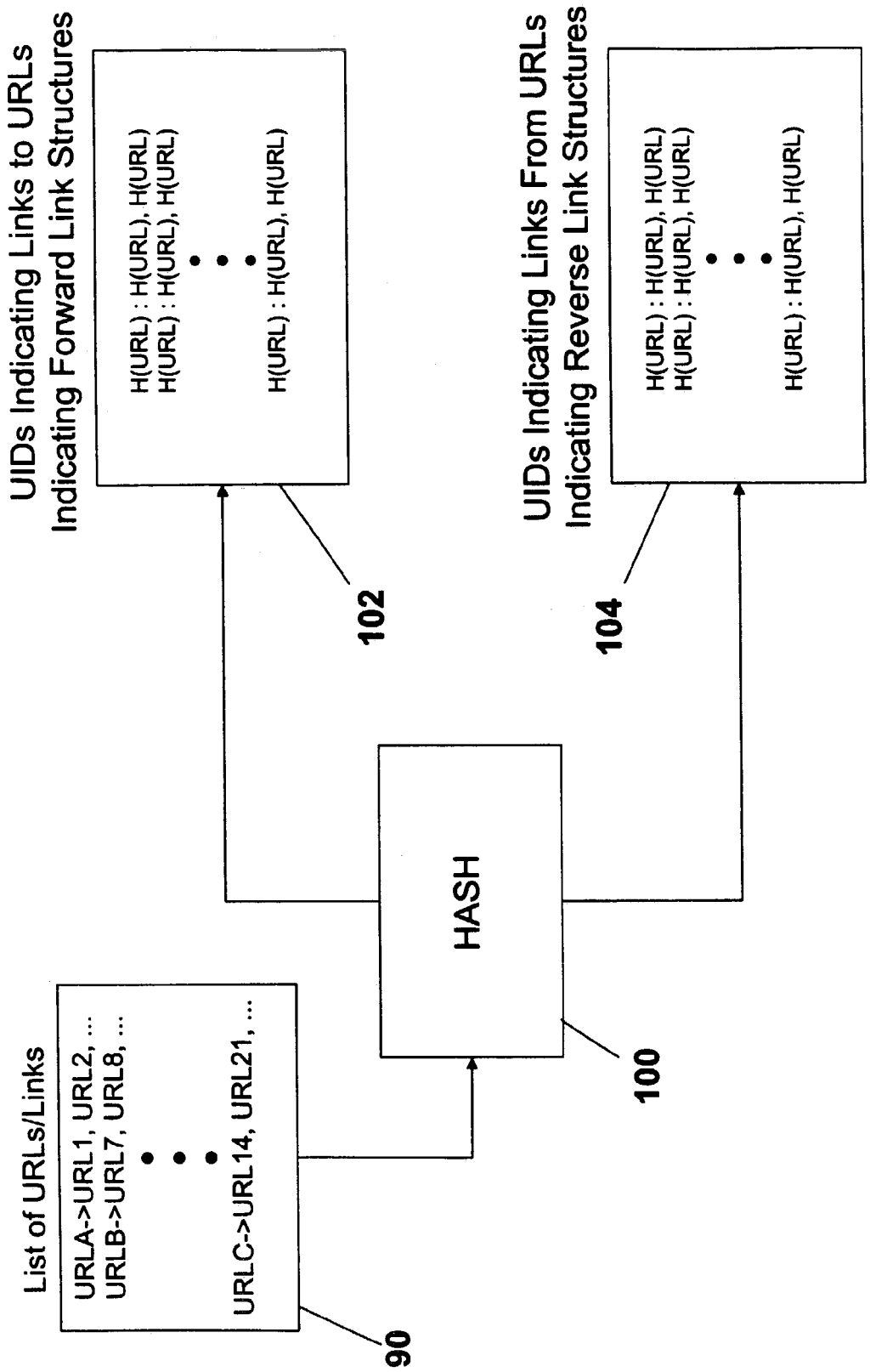
FIG. 6 is a diagram of a database processor having each database table being indicative of different aspects of a URL, in accordance with an exemplary embodiment of the present invention.

UIDs may be assigned to database tables in various ways. In one embodiment, as depicted in FIG. 6, each database table is indicative of different aspects of a URL. Database tables 102 and 104 are maintained by the database. The database table 102 has stored therein hashed URLs, in the form of UIDs, which are indicative of URLs that each URL in the list of URLs 90 links to. For example, referring to the web-graph 200 of FIG. 2, if one of the URLs in the list of URLs 90 corresponds to node 50, the database table 102 would contain UIDs indicative of nodes 52, 54, and 56. The other database table 104 has stored therein hashed URLs in the form of UIDs, which are indicative of URLs that point to each URL in the list of URLs 90. For example, if the direction of links 51, 53, and 55 is reversed, and one of the URLs in the list of URLs 90 corresponds to node 50, the database table 104 would contain UIDs indicative of nodes 52, 54, and 56. The URL list 90 is indicative of the nodes of a database processor (e.g., the nodes associated with a database processor, the sub-graph assigned to a database processor). Thus the database table 102 maps each URL 90 to URLs that each URL 90 links to, and database table 104 maps each URL 90 to URLs that link to each URL 90.

As shown in FIG. 6, the list of URLs 90 is hashed by hasher 100. The hasher 100 may comprise a single hash function or several hash functions. For example, URLs from the list of URLs 90 to be provided to the database table 102 may be hashed by a first hashing function, and URLs from the list of URLs 90 to be provided to the database table 104 may be hashed by a second hashing function. It is well known however, that connecting hash functions in series tends to increase the probabilities of collisions (e.g., duplicate hash values).

Figure 7:
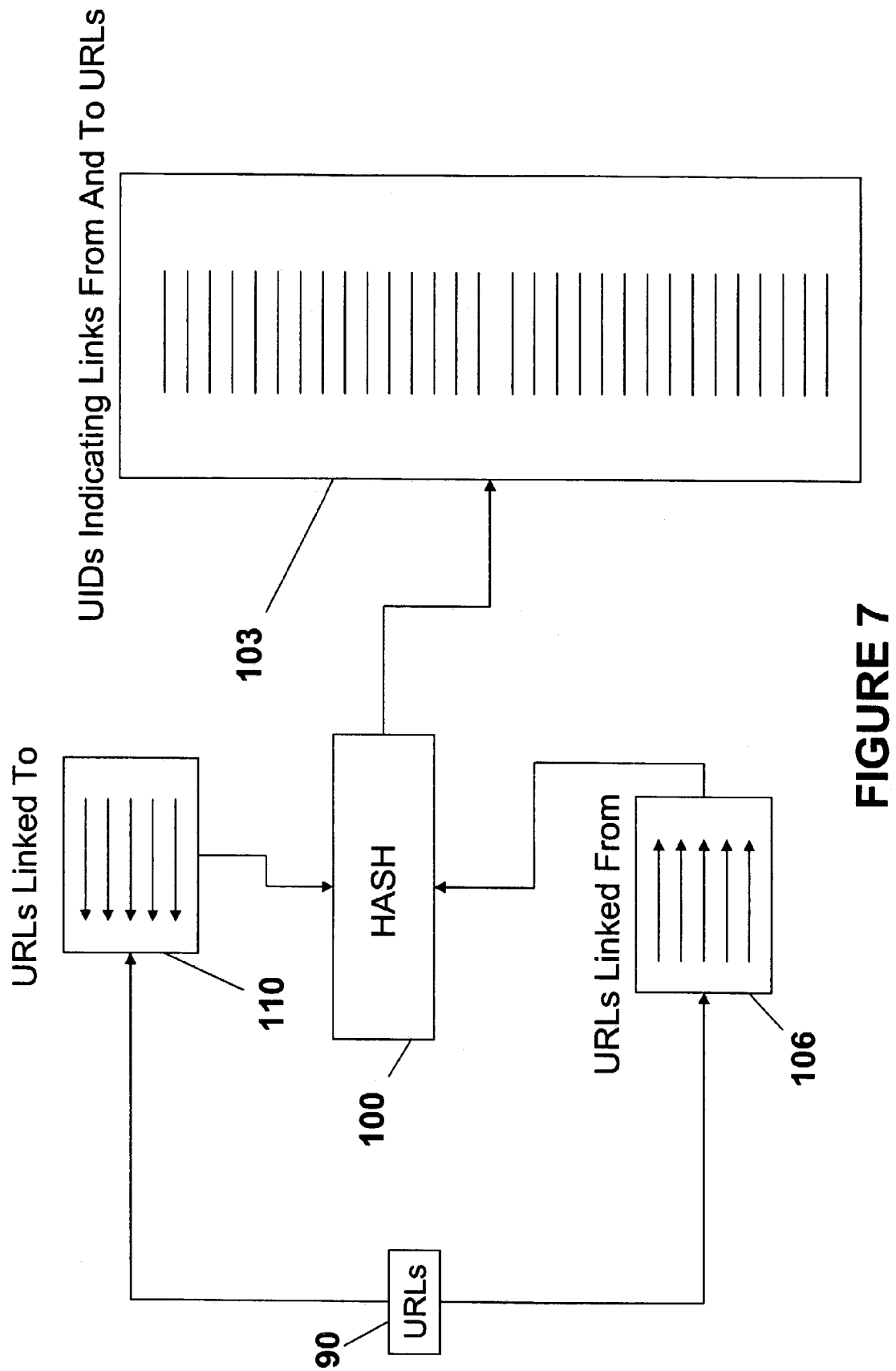
FIG. 7 is a diagram of a database processor having a single database table in accordance with an exemplary embodiment of the present invention.

In another embodiment, as depicted in FIG. 7, a single database table 103 is maintained. The database table 103 contains UIDs indicative of both URLs which the URLs of URL list 90 link to and the URLs that link to each URL in the URL list 90. The list of URLs 90 is parsed into two lists 106 and 110 of URLs. The URL list 106 is indicative of URLs that are linked to each URL in the URL list 90. The URL list 110 is indicative of the URLs to which each URL in URL list 90 links. The arrows shown in list 106 and list 108 depict the fact that list 106 contains forward links and list 110 contains reverse links. This parsing may be accomplished by the database processor, or the URL lists 106 and 110 may be provided to the database processor.

Figure 8:
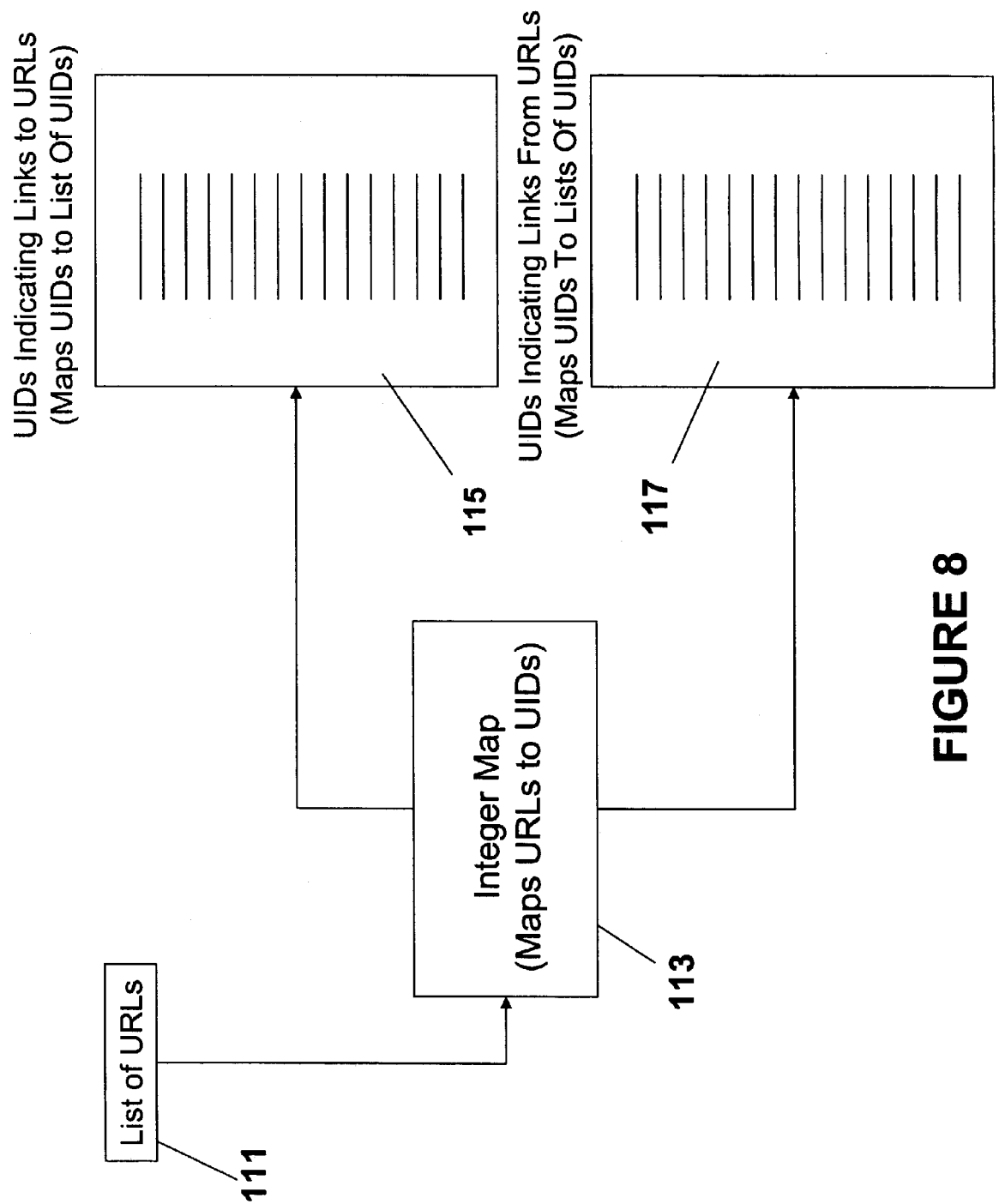
FIG. 8 is a diagram of a database processor comprising an integer map, in accordance with an exemplary embodiment of the present invention.

FIG. 8 is a block diagram of a database processor comprising an integer map 113. In yet other embodiments of the present invention, the database tables map URLs, or URL checksums, to a list of integer values. The integers functions as indices pointing to arrays (tables). For example, as shown in FIG. 8, database tables 115 and 117 contain UIDs in the form of integer values, which are indicative of characteristics of the URLs in the list 111. The URLs of the list 111 are mapped to a unique integer value by the integer map 113. The integer values are provided to the database tables 115 and 117, such that the database table 115 has stored therein UIDs in the form of integer values, which are indicative of URLs that each URL in the list of URLs 111 links to, and the database table 117 has stored therein UIDs in the form of integer values, which are indicative of URLs that point to each URL in the list of URLs 111. The number of integers to which the integer map 113 will map URLs depends upon the number of URLs maintained by the database processor. For example, it the database processor is responsible for maintaining N URLs, the integers may range from 1 to N. As should be readily evident, any of the above described embodiments utilizing hash functions, may alternately, or in combination, utilize integer mapping functions. Although the URLs are described as being mapped to integer values, the mapping is not limited thereto. The URLs may be mapped to floating point values. Furthermore, integer mapping, floating point mapping, and hashing may be utilized in any appropriate combination.

Figure 9:
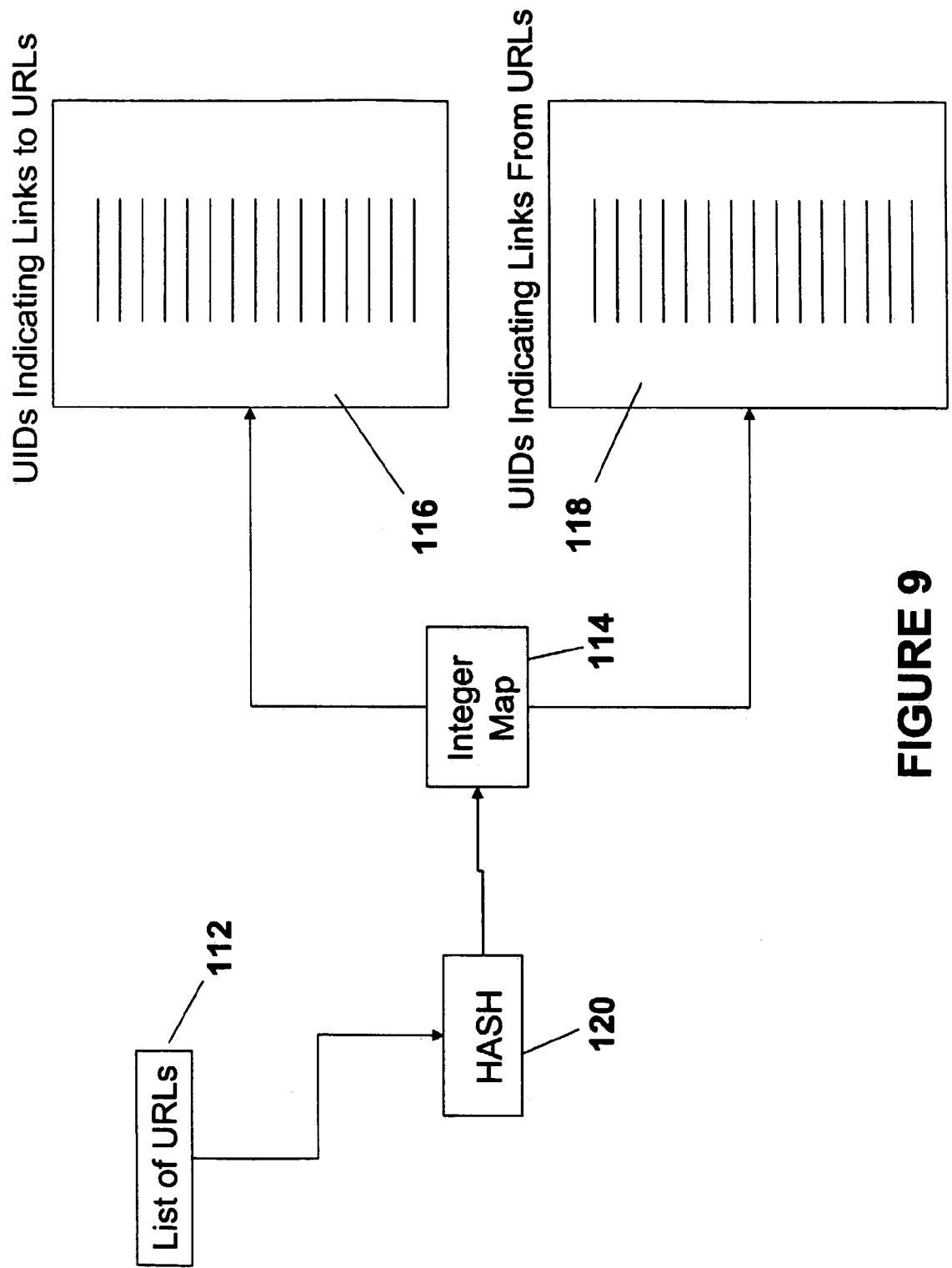
FIG. 9 is a diagram of a database processor wherein each database table maps to a fixed size checksum in accordance with an exemplary embodiment of the present invention.

In another embodiment, as shown in FIG. 9, each database table 116, 118, maps a fixed size checksum (contents of each respective table 116, 118) of each URL to a list of URL checksums, which are indicative of the list of URLs 112. The URLs in the list of URLs 112 are hashed by hasher 120, and the resultant fixed size checksums are provided to the integer map 114. The resultant hashed and integer mapped UIDs are provided to database tables 116 and 118. The database table 116 has stored therein hashed URLs, in the form of UIDs, which are indicative of the URLs that each URL in the list of URLs 112 links to. The database table 118 has stored therein hashed URLs in the form of UIDs, which are indicative of URLs that point to each URL in the list of URLs 112. Hashing and mapping the URLs from the list of URLs 112 by the hasher 120 and the integer map 114, respectively, provides means for reducing the size of the checksums (UIDs), which are stored in the database table 116.

Figure 10:
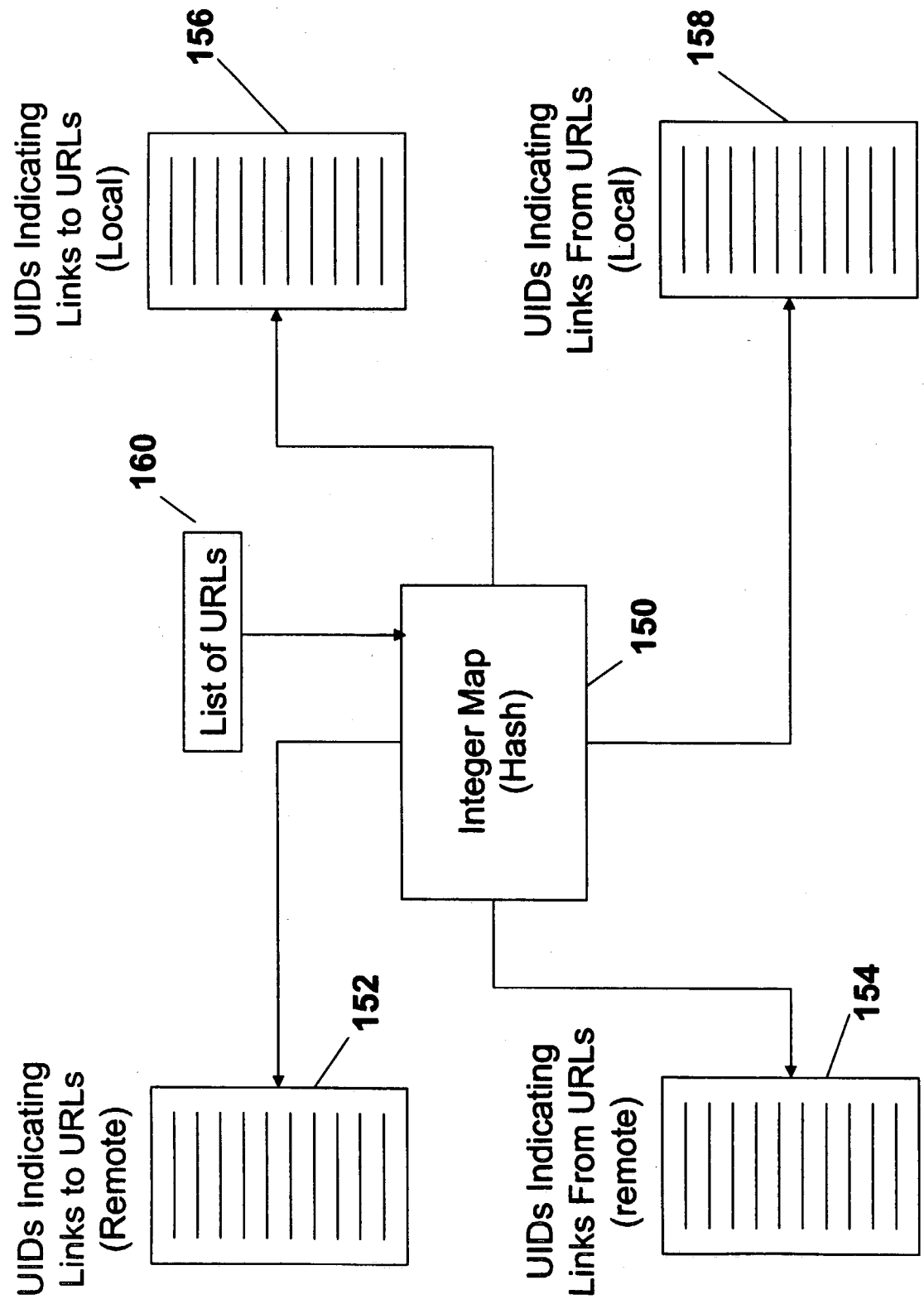
FIG. 10 is a diagram of a database processor comprising database tables separated into remote and local links, in accordance with an exemplary embodiment of the present invention.

FIG. 10 is a block diagram of a database processor comprising database tables separated into remote and local links. A local link is a link that points to, of from, a location on the same database processor, and a remote link is a link that points to, or from, a location on another database processor. The URLs of list 160 are mapped into (assigned) integer values by integer map 150. Note that the URLs alternatively or in addition may be hashed. Respective integer values are provided to remote database tables 152 and 154 and local database tables 156 and 158. The local database table 156 has stored therein UIDs in the form of integer values, which are indicative of local URLs that each URL in the list of URLs 160 links to, and the local database table 158 has stored therein UIDs in the form of integer values, which are indicative of local URLs that point to each URL in the list of URLs 160. The remote database table 152 has stored therein UIDs in the form of integer values, which are indicative of remote URLs that each URL in the list of URLs 160 links to, and the remote database table 158 has stored therein UIDs in the form of integer values, which are indicative of remote URLs that point to each URL in the list of URLs 160. In one embodiment, the highest-order bits (e.g., 2 highest-order bits) of a UID are utilized to encode the database processor maintaining the UID. This mitigates the need to maintain separate tables for local and remote links.

It is to be understood that various combinations of the herein described embodiments are envisioned. It is also envisioned that compression techniques, such as well known delta encoding and/or Huffman encoding, for example, may be applied to the links to further facilitate maintaining a plurality of hyperlinks on a plurality of database processors. Utilizing compression techniques can result in UIDs as small as 1 byte in size. For a description of Huffman encoding, see "Introduction to Algorithms", Thomas H. Cormen, Charles E. Leiserson, and Ronald L. Rivest, MIT Press/McGraw-Hill, 1990, pages 337-44, which is hereby incorporated by reference in its entirety as if presented herein. Furthermore, a database processor is not limited to performing only database functions. For example, a database processor may also perform ranking computations (e.g., page ranking).

Figure 11:
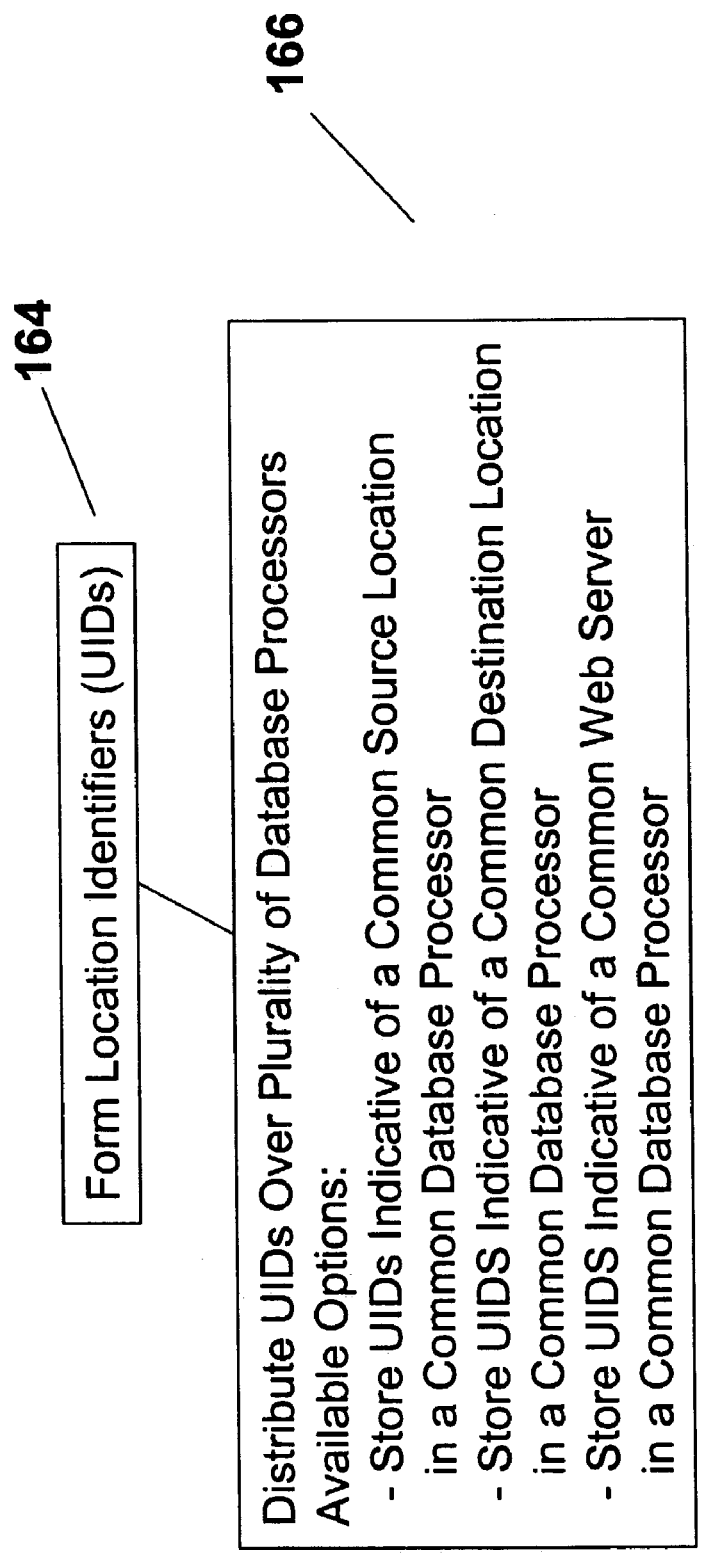
FIG. 11 is a high level flow diagram of a process for maintaining a plurality of hyperlinks distributed over a plurality of database processors in accordance with an exemplary embodiment of the present invention.

FIG. 11 is a high level flow diagram of a process for maintaining a plurality of hyperlinks distributed over a plurality of database processors in accordance with an exemplary embodiment of the present invention. The UIDs are formed at step 164 and the UIDs are distributed over a plurality of database processors at step 166. As described above, the UIDs may be distributed in accordance with any combination of several options. One option includes, for all hyperlinks having a common source location and respective destination locations, the UID for the common source location and the UIDs for the respective destination locations are stored in a common database processor. Another option includes, for all hyperlinks having a common destination location and respective source locations, storing the UID of the common destination location and the respective source locations in a common database processor. A third option includes storing UIDs for all locations having a common web server in a common database processor. Also, the hyperlinks may be distributed in any combination of the above options.

Figure 12:
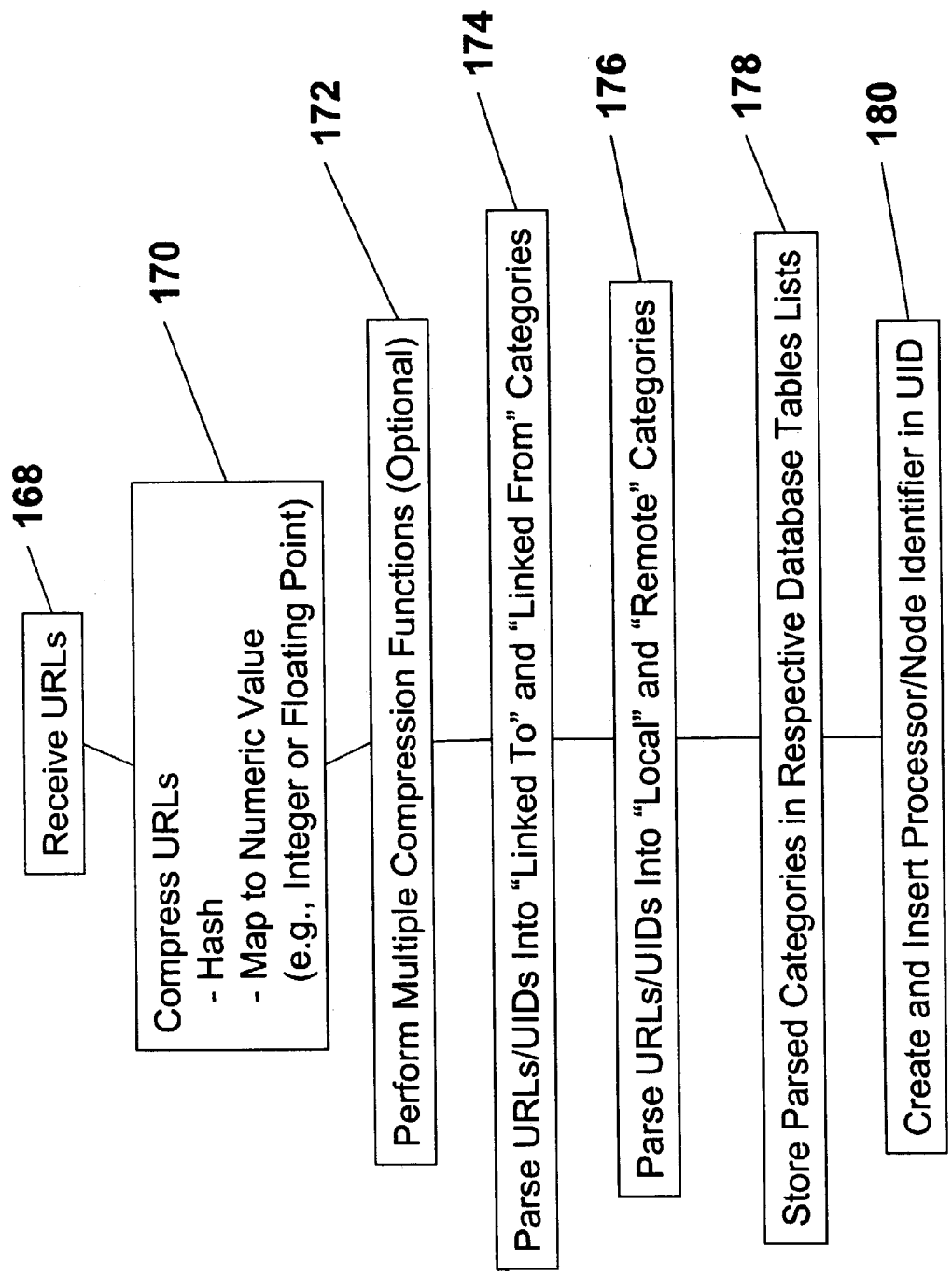
FIG. 12 is a flow diagram of a process for forming and storing UIDs in accordance with an exemplary embodiment of the present invention.

FIG. 12 is a flow diagram of a process for forming and storing UIDs in accordance with an exemplary embodiment of the present invention. At step 168, the URLs from which UIDs are to be formed and stored are received. The URLs are compressed at step 170. Again, options are available. The URLs may be compressed by any of several know hyperlink compression techniques, by hashing the URLs into fixed size checksums, by mapping the URLs to corresponding numeric values (e.g., integer or floating point), of a combination thereof. At step 172, additional compression function may optionally be performed. For example, multiple hashing functions, or combinations of hashing and integer mapping may be performed. At step 174, the URLs, the UIDs, or a combination thereof are parsed. Several options are available for parsed categories. The URLs/UIDs may be parsed into Linked To and Linked From categories, as described above, the URLs/UIDs may be parsed into Local and Remote categories, as also described above, or a combination thereof. The parsed data is stored in database tables at step 178. The database tables may be in the form of a single database table, a database table for each parsed category, or a combination thereof. At step 180, a processor identifier is created and embedded in each UID. This step is optional. In one embodiment of the present invention, a 2-bit value is embedded in each UID to identify the database processor on which that UID is stored.

Figure 13:
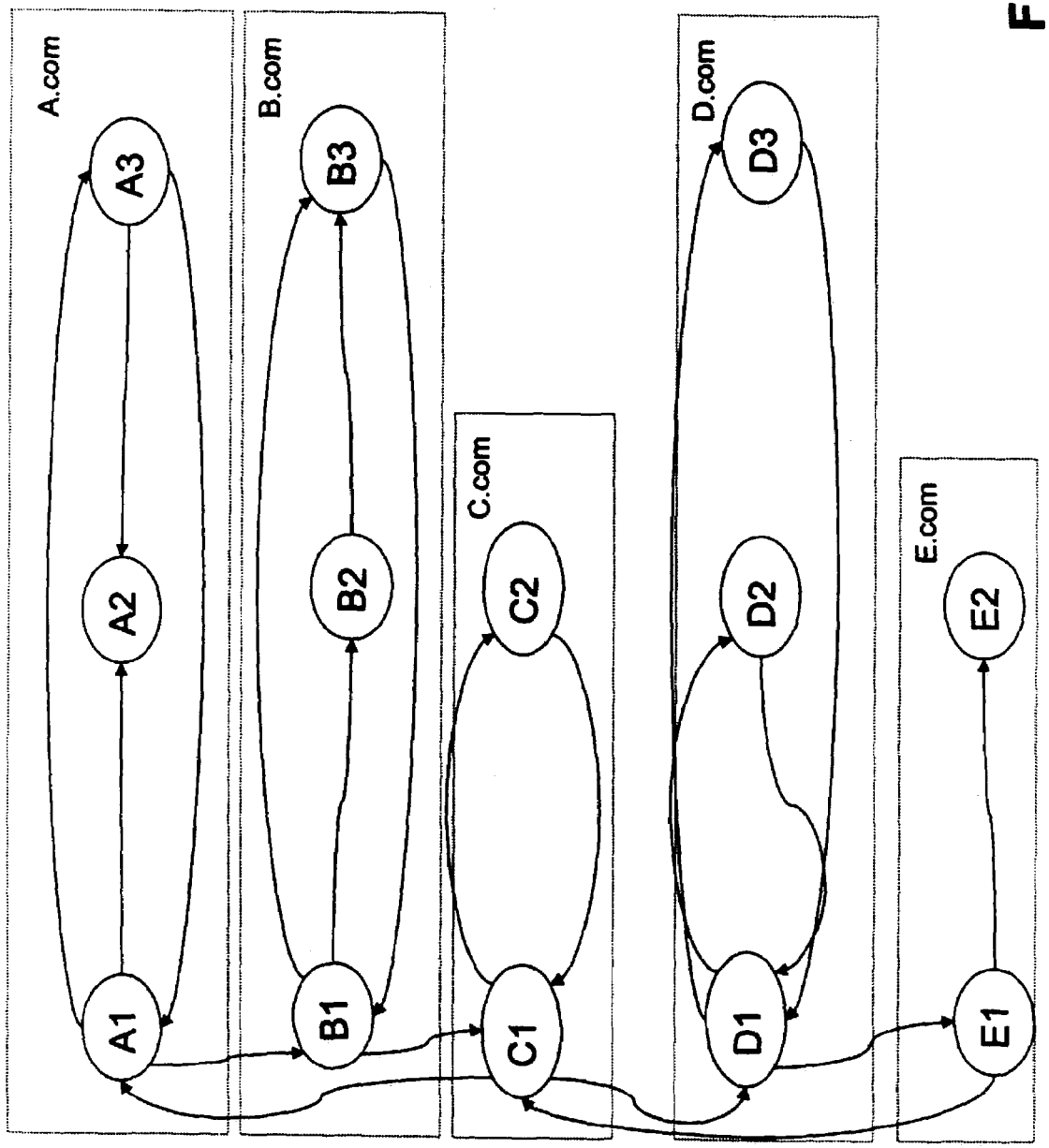
FIG. 13 is an illustration of nodes of a web graph and associated web servers, in accordance with an exemplary embodiment of the present invention.

An example of various embodiments of a distributed database for maintaining hyperlinks is provided below. Referring now to FIG. 13, there is shown an exemplary web-graph comprising web pages A1,A2,A3,B1,B2,B3,C1, C2,D1,D2,D3,E1,and E2. FIG. 13 illustrates a web-graph containing web pages having the following URLs.

http://A.com/1.html (abbreviated as A1)
http://A.com/2.html (abbreviated as A2)
http://A.com/3.html (abbreviated as A3)
http://B.com/1.html (abbreviated as B1)
http://B.com/2.html (abbreviated as B2)
http://B.com/3.html (abbreviated as B3)
http://C.com/1.html (abbreviated as C1)
http://C.com/2.html (abbreviated as C2)
http://D.com/1.html (abbreviated as D1)
http://D.com/2.html (abbreviated as D2)
http://D.com/3.html (abbreviated as D3)
http://E.com/1.html (abbreviated as E1)
http://E.com/2.html (abbreviated as E2)

The web pages are interlinked as indicated by the arrows shown in FIG. 13, and as described below. In this description, a web page with an arrow (->) to another web page indicates the link. For example, the designation w->x, y, z indicates that the web page w contains links to the pages x, y, and z. Thus, as shown in FIG. 13:

A1->A2,A3,B1
A2->
A3->A1,A2
B1->B2,B3,C1
B2->B3
B3->B1
C1->A1,C2,D1
C2->C1
D1->D2,D3,E1
D2->D1
D3->D1
E1->C1,E2
E2->

Also as shown in FIG. 13, the web pages A1, A2, and A3, are hosted by web server A.com; B1, B2, and B3 are hosted by the web server B.com; C1 and C2 are hosted by the web server C.com; D1, D2, and D3 are hosted by the web server D.com; and E1 and E2 are hosted by the web server E.com.

For sake of this example, the link database is distributed over two database processors, DBP1 and DBP2, as depicted in FIG. 14. Let H (the "host map") be a function that maps web server names to database processors. In various embodiments, the function H may be implemented in various forms, such as by a hash function or by an explicit table, for example. In this example, assume: H(A.com)=1, H(A.com)=1, H(B.com)=1, H(C.com)=1, H(D.com)=2, and H(E.com)=2. Again, for sake of this example assume a web crawler performing a breadth-first search and starting to crawl at A1 downloads the pages in the following order: A1 containing links to A2, A3, B1, A2 containing no links, A3 containing links to A1, A2, B1 containing links to B2, B3, C1, B2 containing a link to B3, B3 containing a link to B1, C1 containing links to A1, C2, D1, C2 containing a link to C1, D1 containing links to D2, D3, E1, D2 containing a link to D1, D3 containing a link to D1, E1 containing links to C1, E2, and E2 containing no links.

A link distributor component (not shown) takes the URL (e.g., A1) of a web page and its outgoing links (e.g., A2, A3, B1), and sends them to one of the database processors, depending on H. In our example, A1->A2, A3, B1 is sent to the database processor, DBP1, since the web server component of A1 is A.com, and H(A.com) is 1. In the one embodiment, as shown in FIG. 14, each database processor simply maintains a link table (L1 for DBP1 and L2 for DBP2) from URLs to URL lists. In our example, the table on database processor DBP1 is: A1->A2, A3, B1;A2->;A3->A1, A2;B1->B2, B3, C1;B2->B3 B3->B1; C1, >A1, A2, D1; and C2->C1. The table on database processor DBP2 is: D1->D2, D3, E1; D2->D1; D3->D1; E1->C1, E2; and E2->. Assuming that an average HTML page contains about 40 links (excluding duplicates), and an average URL is 60 bytes, the embodiment of this example requires an average of 2400 bytes per node in the web graph.

In another embodiment, a hash function is used to reduce the size of the tables. Let U be a hash function that maps URLs to fixed length numeric values between 0 and $(2^k-1)$, where k is the number of bits used to represent each value. For purposes of this example, assume:

U(A1)=2e80186778c9a72b; U(A2)=b1e84b994e1842de; U(A3)=252895f8a813cd16;
U(B1)=ff780b176bf81b16; U(B2)=601058e95d29fee3; U(B3)=f4d08688bb22712b;
U(C1)=51c8eaf36eac5c66; U(C2)=cea0b90d587db993; U(D1)=7ea515616c1;
U(D2)=e1c94f556787f334; U(D3)=75099134818c7cfc; U(E1)=d011fd4f540251b1; and
U(E2)=4f79aeb162d3b444 (Values represented in hexadecimal).

Figure 15:
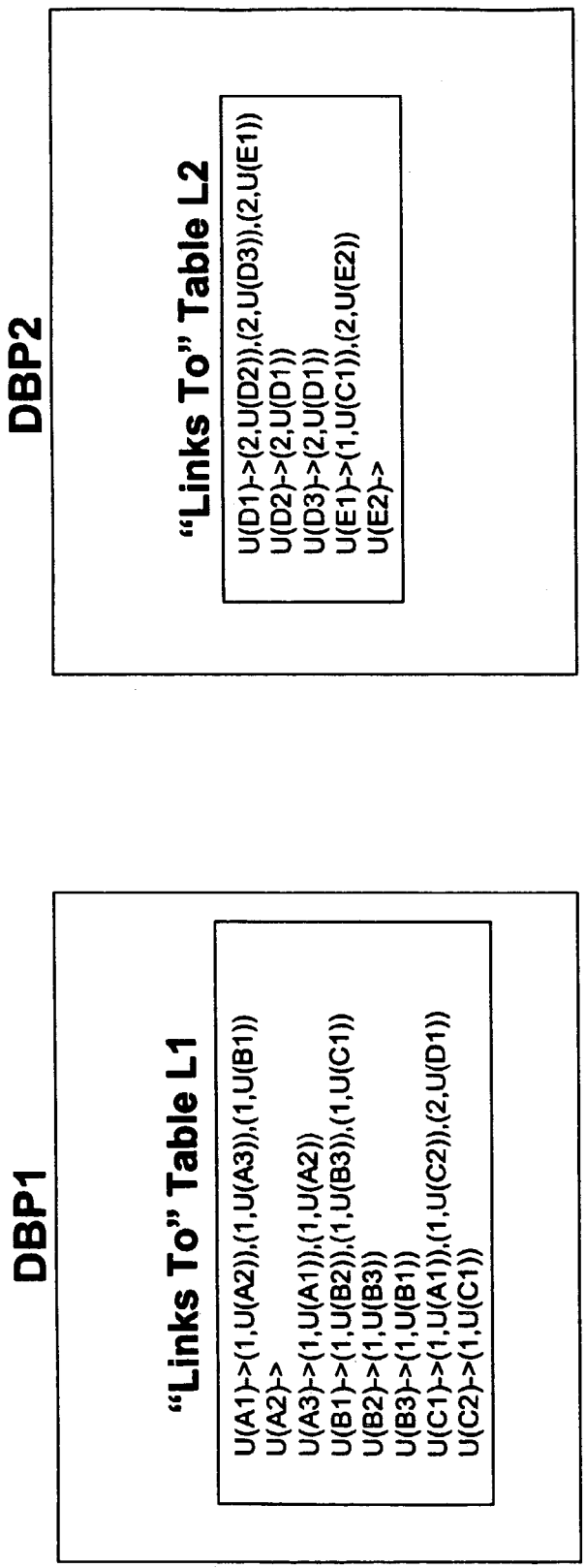
FIG. 15 is an illustration of database processors having link tables in accordance with another exemplary embodiment of the present invention.

As shown in FIG. 15, using this hash function, and storing a pair or values consisting of the ID of the database processor responsible for the link (e.g. database processor DBP1 is responsible for URL A1 because H(A.com)=1), and the hash value of the URL. The table L1 on the database processor DBP1 contains the following.

U(A1)->(1, U(A2)),(1, U(A3)),(1,U(B1))
U(A2)->

U(A3)->(1,U(A1)),(1,U(A2))
U(B1)->(1,U(B2)),(1,U(B3)),(1,U(C1))
U(B2)->(1,U(B3))
U(B3)->(1,U(B1))
U(C1)->(1,U(A1)),(1,U(C2)),(2,U(D1))
U(C2)->(1,U(C1))

and, also as shown in FIG. 15, the table L2 on database processor DBP2 contains the following:
U(D1)->(2,U(D2)),(2,U(D3)),(2,U(E1))
U(D2)->(2,U(D1))
U(D3)->(2,U(D1))
U(E1)->(1,U(C1)),(2,U(E2))
U(E2)->

Replacing U(x) by its numeric value, the link table, L1, on database processor DBP1 contains:
2e80186778c9a72b->(1,b1e84b994e1842de),(1, 252895f8a813cd16),(1,ff780b176bf81b16)
b1e84b994e1842de->
252895f8a813cd16->(1,2e80186778c9a72b),(1, b1e84b994e1842de)
ff780b176bf81b16->(1,601058e95d29fee3),(1, f4d08688bb22712b), (1,51c8eaf36eac5c66)
601058e95d29fee3->(1,f4d08688bb22712b)
f4d08688bb22712b->(1,ff780b176bf81b16)
51c8eaf36eac5c66->(1,2e80186778c9a72b),(1, cea0b90d587db993),(2,7ea11cab515616c1)
cea0b90d587db993->(1,51c8eaf36eac5c66)

and the table, L2, on database processor DBP2 becomes:
7ea11cab515616c1->(2,e1c94f556787f334),(2, 75099134818c7cfc),(2,d011fd4f540251b1)
e1c94f556787f334->(2,7ea11cab515616c1)
75099134818c7cfc->(2,7ea11cab515616c1)
d011fd4f540251b1->(1,51c8eaf36eac5c66),(2, 4f79aeb162d3b444)
4f79aeb162d3b444->

Note that the hash function is non-invertible, that is, it maps URLs to hash values, but does not map hash values back to URLs (this would require, for example, maintaining an explicit table from hash values to URLs).

Since there are potentially infinitely many URLs, but there are only a finite number of values in the range from 0 to $(2^k-1)$ (i.e., $2^k$), there is a possibility that two URLs hash to the same value (the URLs are said to "collide"). In order to keep the probability of collisions reasonably low, in one embodiment, the range of the numeric values is chosen to be at least the square of the number of URLs in the graph. For example, a web graph having fewer than $2^{32}$ (about 4 billion) URLs, is represented by using a hash function that produces 64-bit numeric values. Thus, assuming 64-bit (8-byte) hash values, 1-byte database processor identifiers, and 40 links per page, this embodiment uses 360 bytes per node in the web graph.

In another embodiment, a table T is maintained that maps URLs (or URL hash values) to integer values drawn from a densely packed space. This mapping is non-probabilistic, that is, two different URLs (or URL hash values) always map to two different URL identifiers. Assuming that the URL identifiers are given out in the order that URLs are discovered by the crawler, this example results in the following: T(A1)=0; T(A2)=1; T(A3)=2; T(B1)=3; T(B2)=4; T(B3)=5; T(C1)=6; T(C2)=7; T(D1)=8; T(D2)=9; T(D3)=10; T(E1)=11; and T(E2)=12. Note that T can be distributed over the different database processors, wherein each database processor maintains only those entries for which it is responsible. In this embodiment, as shown in FIG. 16, the link table, L1, on database processor DBP1 contains:

T(A1)->(1,T(A2)),(1,T(A3)),(1,T(B1))
T(A2)->
T(A3)->(1,T(A1)),(1,T(A2))
T(B1)->(1,T(B2)),(1,T(B3)),(1,T(C1))
T(B2)->(1,T(B3))
T(B3)->(1,T(B1))
T(C1)->(1,T(A1)),(1,T(C2)),(2,T(D1))
T(C2)->(1,T(C1));

and the link table, L2, on database processor DBP2 contains:
T(D1)->(2,T(D2)),(2,T(D3)),(2,T(E1))
T(D2)->(2,T(D1))
T(D3)->(2,T(D1))
T(E1)->(1,T(C1)),(2,T(E2))
T(E2)->

Replacing T(x) by its numeric value, the link table L1 on database processor DBP1 contains:
0->(1,1),(1,2),(1,3)
1->
2->(1,0),(1,1)
3->(1,4),(1,5),(1,6)
4->(1,5)
5->(1,3)
6->(1,0),(1,7),(2,8)
7->(1,6);

and link table, L2, on database processor DBP2 contains:
8->(2,9),(2,10),(2,11)
9->(2,8)
10->(2,8)
11->(1,6),(2,12)
12->

Assume now that T is implemented as a table mapping 64-bit (8-byte) URL hash values to 32-bit (4-byte) URL identifiers. In a straightforward implementation of such a table, each entry in T consumes 12 bytes. However, a slightly more sophisticated implementation can reduce the storage requirement to approximately 9 bytes. Furthermore, assuming 1-byte database processor identifiers and 40 links per page, each entry in the table utilizes 200 bytes. As an optimization, each database processor can be assigned a designated range of integers, allowing the omission of the database processor ID from the entries in the table. For example, database processor DBP1 may be assigned the range 0 to 15, and database processor DBP2 may be assigned the range 16 to 31. Thus, the part of T maintained by the database processor DBP1 could contain:
T(A1)=0
T(A2)=1
T(A3)=2
T(B1)=3
T(B2)=4
T(B3)=5
T(C1)=6
T(C2)=7 and the part of T maintained by the database processor DBP2 could contain:
T(D1)=16
T(D2)=17
T(D3)=18
T(E1)=19
T(E2)=20

The part of L maintained by the database processor DBP1 would then contain:
0->1,2,3
1->
2->0,1

3->4,5,6
4->5
5->3
6->0,7,16
7->6 and the part of L maintained by the database processor DBP2 would contain:
16->17,18,19
17->16
18->16
19->6,20
20->

Using this technique (again assuming 32-bit URL identifiers and 40 links per page), each entry in L consumes 160 bytes. Better link compression can be achieved by exploiting a structural property of a web graph, namely, the prevalence of relative links. A relative link is a link from a web page to another web page on the same web server. Typically, about 80% of all links on a web page are relative. This property of a web page can be exploited by assigning numerically close URL identifiers to URLs that are on the same host web server. One way to do so is to take the list of all known URLs, to sort them lexicographically, and then to assign URL identifiers based on the sorted order of the URLs. As it turns out, giving out URL identifiers according to the sequence in which new URLs are discovered by a breadth-first search crawler (as described above) has a very similar effect, and it does not require a priori knowledge of the set of all URLs (or the step of sorting the URLs).

In another embodiment, it is assumed that the URL identifiers were assigned in such a fashion. In this embodiment, a link is not stored as a URL identifier, but rather as the difference between the URL identifiers of this link and the previous link. More specifically, the link table on database processor DBP1:
T(A1)->(T(A2)-T(A1)),(T(A3)-T(A2)),(T(B1)-T(A3))
T(A2)->
T(A3)->(T(A1)-T(A3)),(T(A2)-T(A1))
T(B1)->(T(B2)-T(B1)),(T(B3)-T(B2)),(T(C1)-T(B3))
T(B2)->(T(B3)-T(B2))
T(B3)->(T(B1)-T(B3))
T(C1)->(T(A1)-T(C1)),(T(C2)-T(A1)),(T(D1)-T(C2))
T(C2)->(T(C1)-T(C2));

and the link table on database processor DBP2 would contain:
T(D1)->(T(D2)-T(D1)),(T(D3)-T(D2)),(T(E1)-T(D3))
T(D2)->(T(D1)-T(D2))
T(D3)->(T(D1)-T(D3))
T(E1)->(T(C1)-T(E1)),(T(E2)-T(C1))
T(E2)->.

Substituting the T(x) by their numeric values, is the same as:
0->(1-0),(2-1),(3-2)
1->
2->(0-2),(1-0)
3->(4-3),(5-4),(6-5)
4->(5-4)
5->(3-5)
6->(0-6),(7-0),(16-7)
7->(6-7)
16->(17-16),(18-17),(19-18)
17->(16-17)
18->(16-18)
19->(6-19),(20-6)
20->;

which, after computing the differences, is the same as:
0->1,1,1
1->
2->-2,1
3->1,1,1
4->1
5->-2
6->-6,7,9
7->-1
16->1,1,1
17->-1
18->-2
19->-13,14
20->

Because of the prevalence of relative URLs, the URL identifiers corresponding to the links in a page tend to be numerically close together, so the numeric difference between one link on a page and the next tends to be small. This can be exploited by encoding these small numbers using a variable-length encoding scheme, such as a Huffman encoding for example. Empirically speaking, this allows one to encode each link using about 1 byte of data. So, assuming 40 links per page, this embodiment utilizes 40 bytes per node in the web graph (plus about 9 bytes per unique URL in T).

Figure 17:
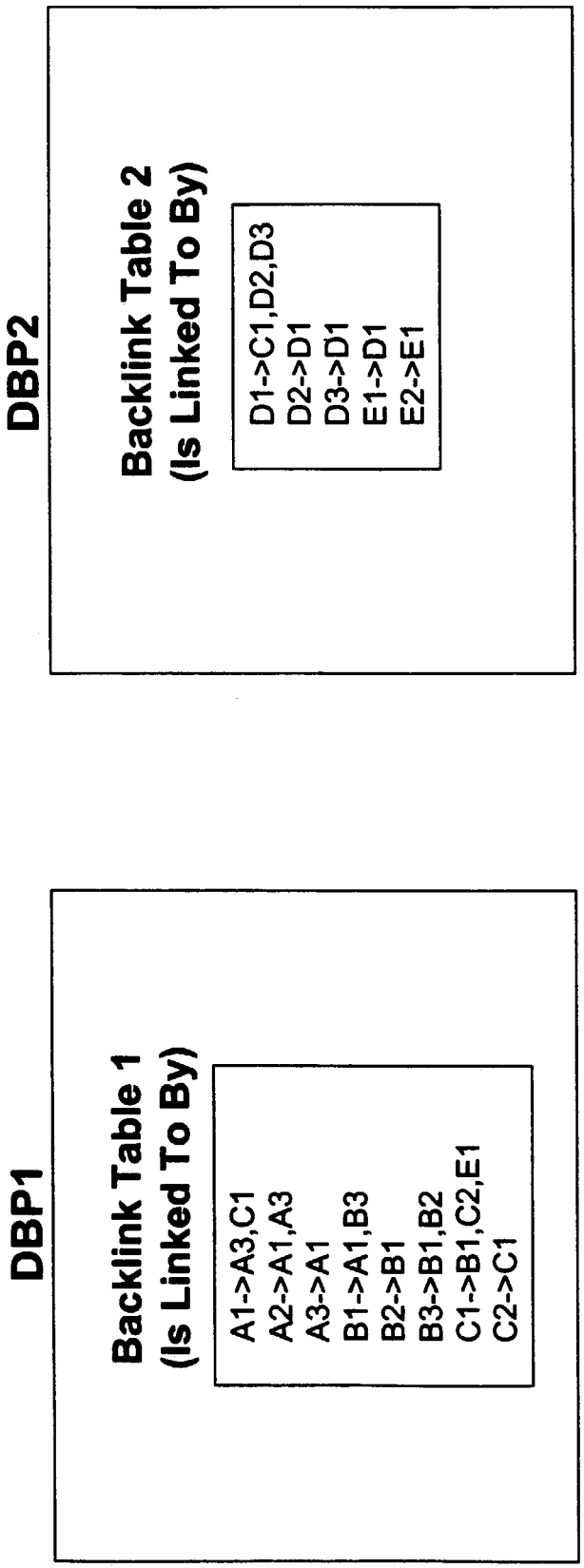
FIG. 17 is an illustration of backlink tables in accordance with an exemplary embodiment of the present invention.

Continuing with this example, some applications require the ability to traverse hyperlinks backwards. If the distributed database is to support such applications, it will also contain a distributed "backlink table" BL. Referring to FIG. 17, the backlink table on database processor DBP1 is:
A1->A3,C1
A2->A1,A3
A3->A1
B1->A1,B3
B2->B1
B3->B1,B2
C1->B1,C2,E1
C2->C1

The backlink table on database processor DBP2 is:
D1->C1,D2,D3
D2->D1
D3->D1
E1->D1
E2->E1

A method for maintaining a database of hyperlinks as described herein may be embodied in the form of computer-implemented processes and system for practicing those processes. A method for maintaining a database of hyperlinks as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for maintaining a database of hyperlinks as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

A system and method for maintaining a plurality of hyperlink via a distributed database in accordance with the present invention provides an efficient way to store a webgraph induced by the pages of the World Wide Web and the hyperlinks between them. Also provided is a very fast means to determine which hyperlinks point to or leave a specific web page. This functionality is particularly advantageous to processes that perform a computation over all or part of the web graph, such as link-based ranking algorithms and services such as the "who links to this page" service offered by GOOGLE and ALTAVISTA.

Although illustrated and described herein with reference to certain specific embodiments, the system and method for maintaining a plurality of hyperlinks via a distributed database as described herein are nevertheless not intended to be limited to the details shown. Rather, various modifications may be made in the details within the scope and range of equivalents of the claims and without departing from the spirit of the invention.

What is claimed is:

1. A method for maintaining a database of hyperlinks, each hyperlink having a respective source location and a respective destination location; said method comprising:
    forming respective location identifiers indicative of at least one of said source and destination locations, wherein a location identifier comprises a value indicative of at least one of:
        a respective location compressed via a hash function; and
        a numeric value assigned to a respective location;
    distributing and storing said location identifiers over a plurality of database processors of a distributed database;
    maintaining said location identifiers so as to provide an indication of a respective hyperlink structure associated with each location identifier by maintaining at least one table in the database for mapping a source location to a respective destination location for each hyperlink of the database of hyperlinks;
    performing at least one of:
        for all hyperlinks having a common source location, maintaining a location identifier indicative of said common source location in one of said plurality of database processors; and maintaining location identifiers indicative of all destination locations of said hyperlinks having a common source location in said one of said plurality of database processors; and
        for all hyperlinks having a common destination location, maintaining a location identifier indicative of said common destination location in one of said plurality of database processors; and maintaining location identifiers indicative of all source locations of said hyperlinks having a common destination location in said one of said plurality of database processors;
    generating database processor identifiers indicative of a database processor on which a corresponding location identifier is stored;
    embedding said database processor identifier within each location identifier; and ranking web pages corresponding to said locations.

2. A method in accordance with claim 1, wherein each location is associated with a respective web server, said method further comprising:
    maintaining location identifiers for all locations having a common web server in one of said plurality of database processors.

3. A method in accordance with claim 1, further comprising the step of: compressing each location for providing a fixed size respective location identifier.

4. A method in accordance with claim 3, wherein each location is a Uniform Resource Locator (URL).

5. A distributed database for maintaining a plurality of hyperlinks, each hyperlink having a respective source location and a respective destination location, said distributed database comprising:
    a plurality of database processors, each database processor comprising:
        a data providing portion for providing data to said plurality of database processors;
        a uniform resource locator (URL) receiving portion for receiving URLs;
        a URL identifier (UID) generator for generating UIDs indicative of at least a portion of said source and destination locations, wherein said UID generator generates database processor identifiers indicative of a database processor on which a corresponding UID is stored and embeds said database processor identifier within each UID
        a data storage portion for:
            storing said UIDs; and
            maintaining said UIDs so as to provide an indication of a respective hyperlink structure associated with each UID by maintaining at least one table in the database for mapping a source location to a respective destination location for each hyperlink of the database of hyperlinks; and
        a compressor for compressing said URLs via at least one of hashing each URL and assigning a numeric value to each URL, wherein, at least one of:
            for all hyperlinks having a common source location, UIDs indicative of said common source location are maintained in one of said plurality of database processors and UIDs indicative of all destination locations of said hyperlinks having a common source location are maintained in said one of said plurality of database processors; and
            for all hyperlinks having a common destination location, UIDs indicative of said common destination location are maintained in one of said plurality of database processors and UIDs indicative of all source locations of said hyperlinks having a common destination location are maintained in said one of said plurality of database processors.

6. A distributed database in accordance with claim 5, each UID generator further comprising a parser for parsing at least one of said URLs.

7. A distributed database in accordance with claim 5, wherein: UIDs for URLs having a common web server are maintained in one of said plurality of database processors.

8. A distributed database in accordance with claim 5, wherein: said UID generator generates fixed size UIDs.

9. A computer readable medium having stored thereon computer-executable instructions for maintaining a database of hyperlinks by performing the steps of:
    forming respective location identifiers indicative of at least one of said source and destination locations, wherein a location identifier comprises a value indicative of at least one of:
        a respective location compressed via a hash function; and
        a numeric value assigned to a respective location;

distributing said location identifiers over a plurality of database processors of a distributed database;

maintaining said location identifiers so as to provide an indication of a respective hyperlink structure associated with each location identifier by maintaining at least one table in the database for mapping a source location to a respective destination location for each hyperlink of the database of hyperlinks; and at least one of:

for all hyperlinks having a common source location, maintaining a location identifier indicative of said common source location in one of said plurality of database processors and maintain location identifiers indicative of all destination locations of said hyperlinks having a common source location in said one of said plurality of database processors; and for all hyperlinks having a common destination location, maintaining a location identifier indicative of said common destination location in one of said plurality of database processors and maintain location identifiers indicative of all source locations of said hyperlinks having a common destination location in said one of said plurality of database processors;

generating database processor identifiers indicative of a database processor on which a corresponding location identifier is stored;

embedding said database processor identifier within each location identifier; and ranking web pages corresponding to said locations.

10. A computer readable medium in accordance with claim 9, wherein each location is associated with a respective web server, said computer-executable instructions further for:

maintaining location identifiers for all locations having a common web server in one of said plurality of database processors.

11. A computer readable medium in accordance with claim 9, said computer-executable instruction further for:

compressing each location for providing a fixed size respective location identifier.

12. A computer readable medium in accordance with claim 11, wherein each location is a Uniform Resource Locator (URL).

* * * * *